UNITED STATES PATENT OFFICE.

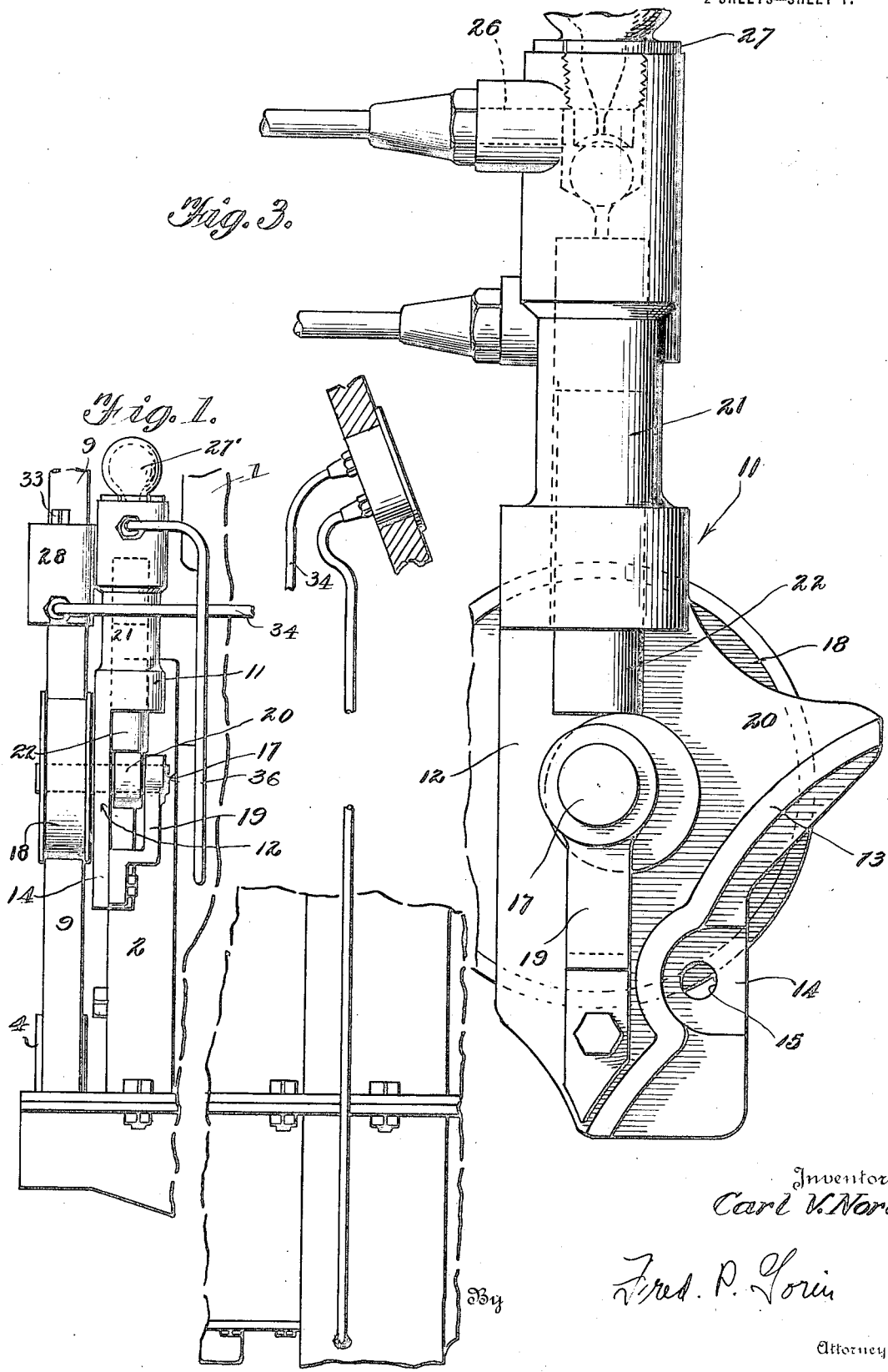

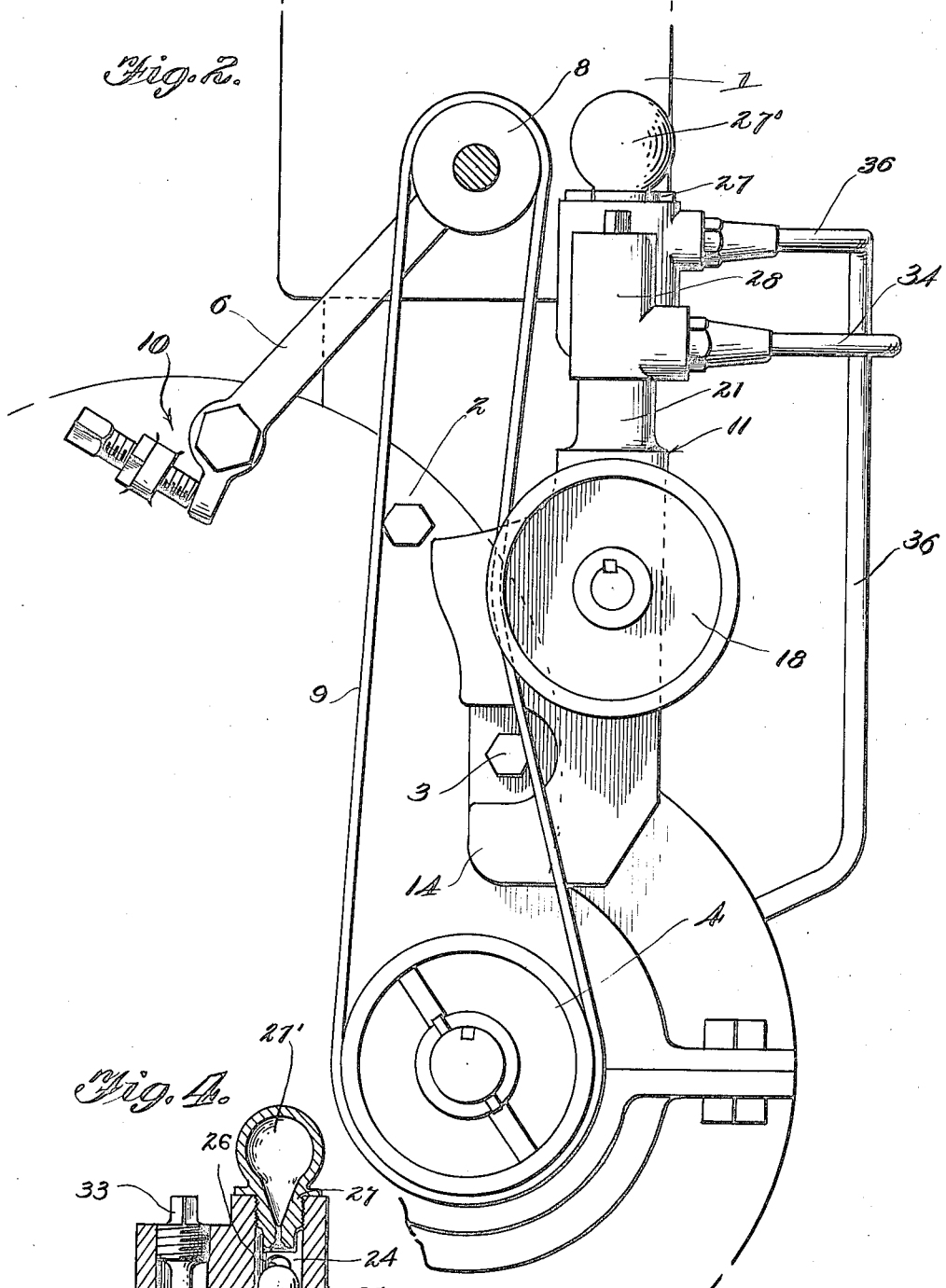

CARL V. NORD, OF SEATTLE, WASHINGTON.

LUBRICATING DEVICE FOR AUTOMOBILES.

1,422,608. Specification of Letters Patent. Patented July 11, 1922.

Application filed August 9, 1921. Serial No. 490,972.

*To all whom it may concern:*

Be it known that CARL V. NORD, a citizen of the United States, residing at Seattle, in the county of King and State of Washington, has invented certain new and useful Improvements in Lubricating Devices for Automobiles, of which the following is a specification.

This invention relates to improvements in oil pumps for automobile engines, particularly Fords.

A number of types of automobiles use the splash system of lubrication for the cam shaft and crank shaft bearings which has one serious disadvantage. This lies in the fact that when a car is climbing a long hill the oil in the crank case runs back in the rear end of the case and leaves the front end dry. The bearings then become hot and cause the engine to overheat and quite frequently burn out.

An object of this invention is to provide positive means for circulating the oil from the rear end of the crank case into the front end to overcome the disadvantages above mentioned.

Another object of the invention is to construct a pump cylinder and bracket in one piece which can be secured in a convenient location on the engine block, so that the fan belt will furnish the driving power.

With these and other objects in view the construction of the invention is particularly pointed out in the following description and claim.

In the drawings:

Fig. 1 is a side elevation of the invention, the engine block being broken away and a portion of the instrument board and fly wheel casing being shown to show the oil feed pipe and circulating gauge.

Fig. 2 is a front elevation of the invention applied and in operative position on an engine block.

Fig. 3 is a rear view of the invention detached.

Fig. 4 is a sectional view through the upper portion of the pump cylinder.

The engine block 1, shown in Fig. 1 is provided at the forward end with a removable cover 2 secured in place by bolts 3, which is adapted to be removed to provide access to the cam gears. The crank shaft 4 extends beyond the front of the engine, and has a fan driving pulley 4' secured thereon. An arm 6 is pivoted to the front portion of the engine and has the fan driving pulley 8 rotatably mounted thereon in line with the pulley 4, and a belt 9 passing over both pulleys for driving pulley 8. The arm 6 is provided with the adjustment 10 for tightening the belt. All of the above mentioned structure is part of the usual type of Ford engine and forms no part of the present invention, which is hereafter described.

11 indicates a block member which is formed at the lower end to fit the contour of a portion of the cover 2 and to be secured thereto by one of the bolts 3. This lower portion of the member 11 is formed into a plate portion 12 provided on the rear face with a laterally projecting flange 13 formed to fit the edge of cover 2 and having the edge of the plate extending over the front of the cover as at 14, and provided with an opening 15 to receive one of the bolts 3.

Above the flange 13 the plate 12 is provided with a bearing 16 for a shaft 17 which extends beyond the front of the plate and is provided with a pulley 18 adapted to engage the belt 9 as shown. The other end of the shaft 17 is mounted in a bearing carried by the bracket 19 which is secured to the plate 12, as shown, the shaft having a cam 20 mounted thereon between bracket 19 and plate 12 for operating the pump piston hereafter described.

Above the plate portion 12 the block member 11 is formed into a cylinder 21 in which the piston 22 actuated by the cam 20 is slidable, the upper end of the cylinder communicating by the passage 23 with the outlet valve chamber 24 formed in the upper end of the block member. A ball valve 25 prevents the back flow from outlet passage 26 and is held in the outlet valve chamber 24 by a member 27 threaded into the body. The member 27 has an enlarged portion 27' forming an air chamber in communication with the cylinder for maintaining an even pressure in the system.

A projection 28 is formed on the upper end of the block member and provided with an inlet valve chamber 29 in which the ball 30 is placed to prevent a back flow in the inlet passage 31. The inlet valve chamber and the passage 23 are in communication through the passage 32, and a plug 33 closes the end of the inlet valve chamber and governs the movement of the ball 30.

An inlet conduit 34 extends from the inlet passage 31 to a circulating guage 35 mounted on the instrument board of the automobile and thence to the bottom portion of the fly wheel casing as indicated in Fig. 1. An outlet conduit 36 extends from the outlet passage 26 to convey oil from the pump to the forward end of the crank case as shown in Fig. 1, where the oil is sprayed over the front bearings.

It is clear from the above description and drawings that when an engine is going up a steep grade and the oil in the crank case runs to the rear end that the pump operated by the fan belt will produce the necessary circulation and feed of the oil to the front bearings to properly lubricate them and prevent overheating and the other disadvantages.

The pump is easily applied without changing the structure of the engine in any way which makes it adaptable to models of cars now in use without incurring a large cost for installation.

What I claim is:

An oil circulating pump, comprising a block member having a plate portion with a flange projecting laterally therefrom and of predetermined contour adapted to fit a portion of an engine casing, said plate portion having a bearing therein, a bracket secured to the plate portion and extending upwardly to form a bearing in alignment with the first-mentioned bearing, a shaft mounted in the bearings, the block member being formed into a pump above the plate portion and having a piston mounted to reciprocate therein, means on the shaft between the bearings for operating the piston in the rotation of the shaft, a pulley mounted on the shaft beyond the plate portion, and connections with the crank case of an engine whereby oil may be circulated therein.

In testimony whereof I affix my signature.

CARL V. NORD.